Oct. 26, 1954 M. R. MAUGE 2,692,917

SWITCHING SYSTEM FOR GROUPED TELEPHONE LINES

Filed March 3, 1950 3 Sheets-Sheet 1

INVENTOR
Marcel Roger Mauge
BY Robert Harding Jr.
ATTORNEY

SWITCHING SYSTEM FOR GROUPED TELEPHONE LINES

Filed March 3, 1950 3 Sheets-Sheet 2

INVENTOR
Marcel. Roger : Mauge
BY Robert Harding Jr
ATTORNEY

INVENTOR
Marcel Roger - Mauge
BY
Robert Harding Jr.
ATTORNEY

Patented Oct. 26, 1954

2,692,917

UNITED STATES PATENT OFFICE 2,692,917

SWITCHING SYSTEM FOR GROUPED TELEPHONE LINES

Marcel Roger Mauge, Boulogne Billancourt, France, assignor to International Standard Electric Corporation, New York, N. Y., a corporation of Delaware Application March 3, 1950, Serial No. 147,357

Claims priority, application France March 11, 1949

6 Claims. (Cl. 179—18)

The present invention relates to improvements to switching systems for grouped telephone lines used for the same class of service, or for one subscriber, the said systems being particularly useful in the case in which the lines are characterized by marking potentials.

In switching systems at present used, the final selectors, the lines of a given subscriber are generally allotted to such a subscriber or to the same service for consecutive lines corresponding to the same final selector. When the brush carriage of the said selector is hunting it moves until it meets a potential characterizing the called line. The stopping of the brush carriage can only take place when it has reached a free line in the group or the last line of the group even if this last line is busy, in order to stop the finder switch when no line in the group is free. This method imposes restrictions in the distribution of the lines of a given group. These lines must be practically consecutive on the arc of the same final selector. This limitation in the distribution of the lines is harmful when a subscriber having one or several lines requires one or several supplementary lines and the setup of the exchange does not permit giving to the subscriber lines the numbers of which are close to the numbers of the lines which have already been allotted to the subscriber.

It is one of the objects of the present invention to provide means for connecting several grouped lines to any terminals of an arm of a final selector whilst preserving the advantages of grouped lines according to the connection scheme at present utilized; that is to say that some lines in the group, called "heads of group" in the following description, permit the calling of any one of the free lines of the group when these lines are called by their own number, the other lines preserving their special characteristics of non-grouped lines.

According to a feature of the present invention, there is provided a test arrangement comprising in combination, means for characterizing lines in a group, means for registering the characteristics of the group when the first of this group is met and met when this group is not free, means for making the test under the control of the register and for stopping the hunting when a line having identical characteristics is met during the hunting process.

According to another feature of the invention, there is provided for causing the hunting of grouped lines connected at any points in the arc of a final selector, a device comprising in combination, a final selector on which each line has a supplementary terminal, means for characterizing this supplementary terminal when the line is a head-of-group line by means of an electrical variation chosen amongst a set of electrical variations characterizing the lines which are heads of groups, a supplementary brush fixed to the brush carrier of the said final selector, the said brush being adapted to explore supplementary terminals, a device adapted to compare electrical variations such as those applied to said supplementary terminals, when these electrical variations are applied to the said terminals, means for applying to the comparing device equal electrical variations, means for utilizing the said comparing device for controlling the opening of a circuit when the electrical magnitudes to be compared which are applied thereto are unequal, means for utilizing the electrical variations applied to the supplementary terminal of each "head-of-group" line in order to modify the electrical magnitude applied to one of the terminals of the comprising device and, therefore, to open the circuit placed under the control of the comparing device, means for utilizing the comparing device to control the starting of a device which successively provides at the other terminal of the comparing device each one of the electrical variations of the head-of-group lines, means adapted, on the one hand, to stop the device giving successively electrical magnitudes for the head-of-group lines and, on the other hand, for controlling the hunting of the final selector when the two electrical magnitudes applied to the comparing device, one being characteristic of an electrical variation applied to the supplementary terminal of the head-of-group line on the final selector and the other being one of the electrical characteristic magnitudes characterizing heads of groups lines, are equal, means adapted to enable the displacement of the brush carrier of the final selector under the control of the supplementary terminal in order to stop the said brush carrier when a head-of-group line is free, means for suppressing all electrical magnitudes on the supplementary brushes and on the head-of-group lines when all the lines are busy.

According to another feature of the invention, there is provided means for applying an electrical variation characterizing the head-of-group lines to each one of the supplementary terminals of several of the lines allotted to a single subscriber or to the same service.

According to another feature of the invention, there is provided means capable of allotting to a single service lines connected to different final selectors and to use sets of brushes separating two groups of lines.

According to another feature of the invention, the above described system may be combined with the system of hunting for grouped lines, as described in French Patent No. 924,952, filed on January 17, 1946, under the title "Improvements in Automatic Telephone System."

Figure 3B:
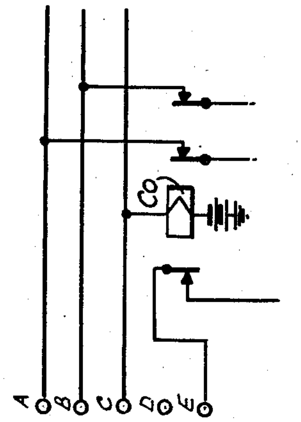
Figure 3E:
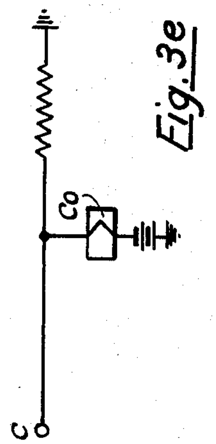
Figures 3A, 3C, 3D:
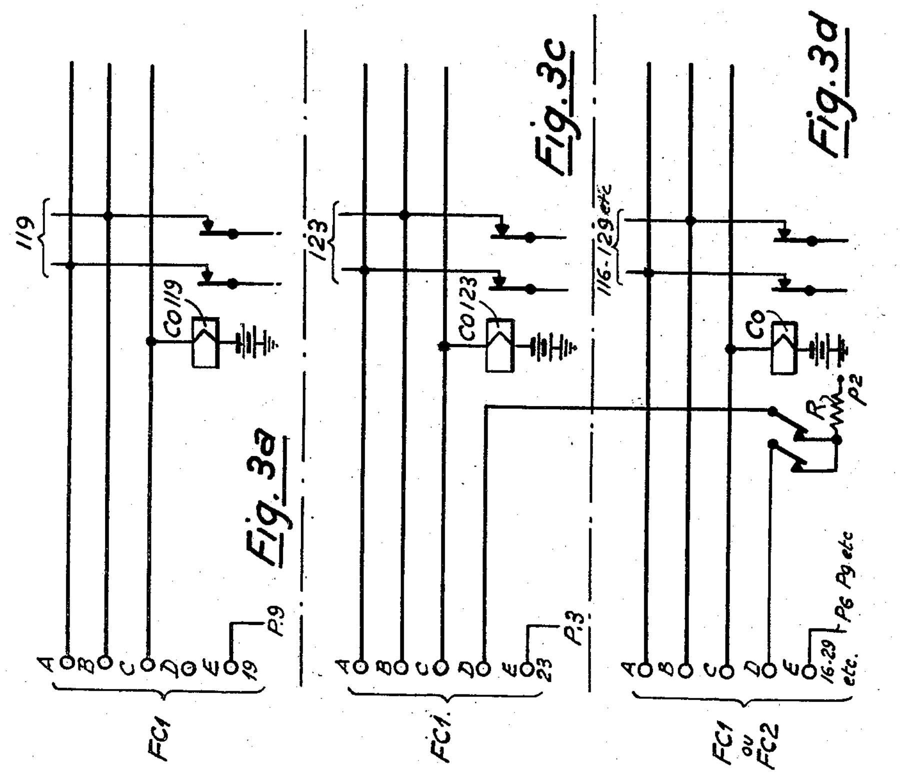

Fig. 3*a* represents a simple line or a last P. B. X line in the group permitting consecutive grouping.

Figure 3*b* represents a first line intermediary line of a group with consecutive grouping;

Fig. 3*c* represents the first line or head line of a group of lines with non-consecutive grouping.

Fig. 3*d* represents a supplementary line of the said group such as the head line of the group represented in Fig. 3*c*.

Fig. 3*e* represents the state of wire *c* for a busy line.

In the various figures there has been shown only the devices necessary for an understanding of the invention; the operation of the devices before ascertaining the state of the line is outside the scope of the present invention and has not therefore been described.

Figure 1:
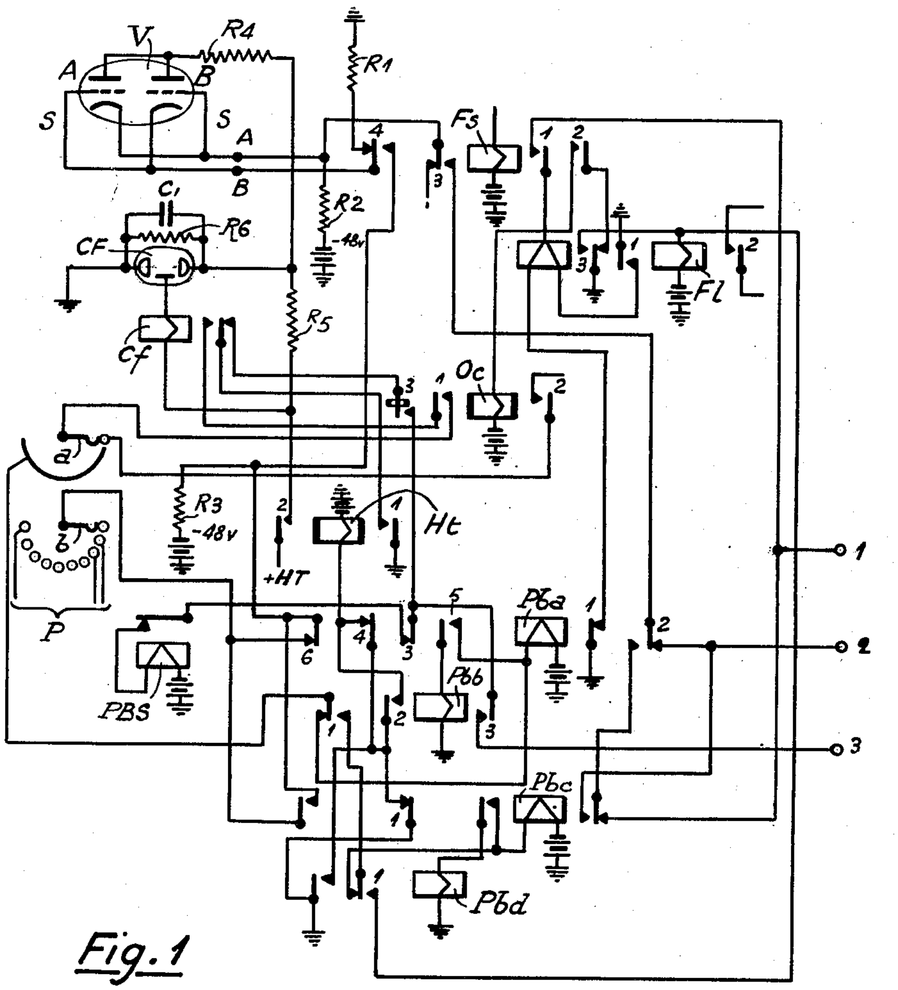
Fig. 1 represents a portion of the register used, on the one hand, for recognizing the characteristic of the lines, so called "head of group" lines, and, on the other hand, for controlling the stepping of the final selector for the hunting for a line belonging to a group of lines allotted to a single subscriber or to a single service.

By referring to Fig. 1 it will be understood that the various devices shown have the following functions:

Tube V and the cold cathode tube CF are used for identifying potentials.

The step-by-step switch having arcs *a* and *b* and operating magnet PBS is used to ascertain the number of the group of lines. Relay *Fs* is actuated at the end of the unit selection. Its energisation path has not been shown since the invention is concerned with what happens after the units selection has been made. The setting-in position of the unit selectors is outside the scope of the present invention. Relay *Ft* characterizes the state of the called line; it operates, if this line is available, and remains idle if the line is busy.

Relay F1 characterizes the availability of the called line.

Relay Oc characterizes the state of busying of the called line.

Relay *Cf* characterizes the identity of the potentials compared by tube V.

Relay *Ht* controls the connection of the high tension supply to vacuum tube V and to the cold cathode tube CF. It enables the ionising of tube CF.

Relay *Pba* signals that the line reached is a "head of group" line belonging to non-consecutive lines.

Relay *Pbb* ascertains the state of deionising tube CF after its operation, according to the result of the detection of the characteristic of the "head of group" line.

Relay *Pbc* ascertains that the final selector has left the position where it stopped after the selection of the units.

Relay *Pbd* ascertains the ionizing of tube CF after its operation pursuant to the preceding verification.

Figure 2:
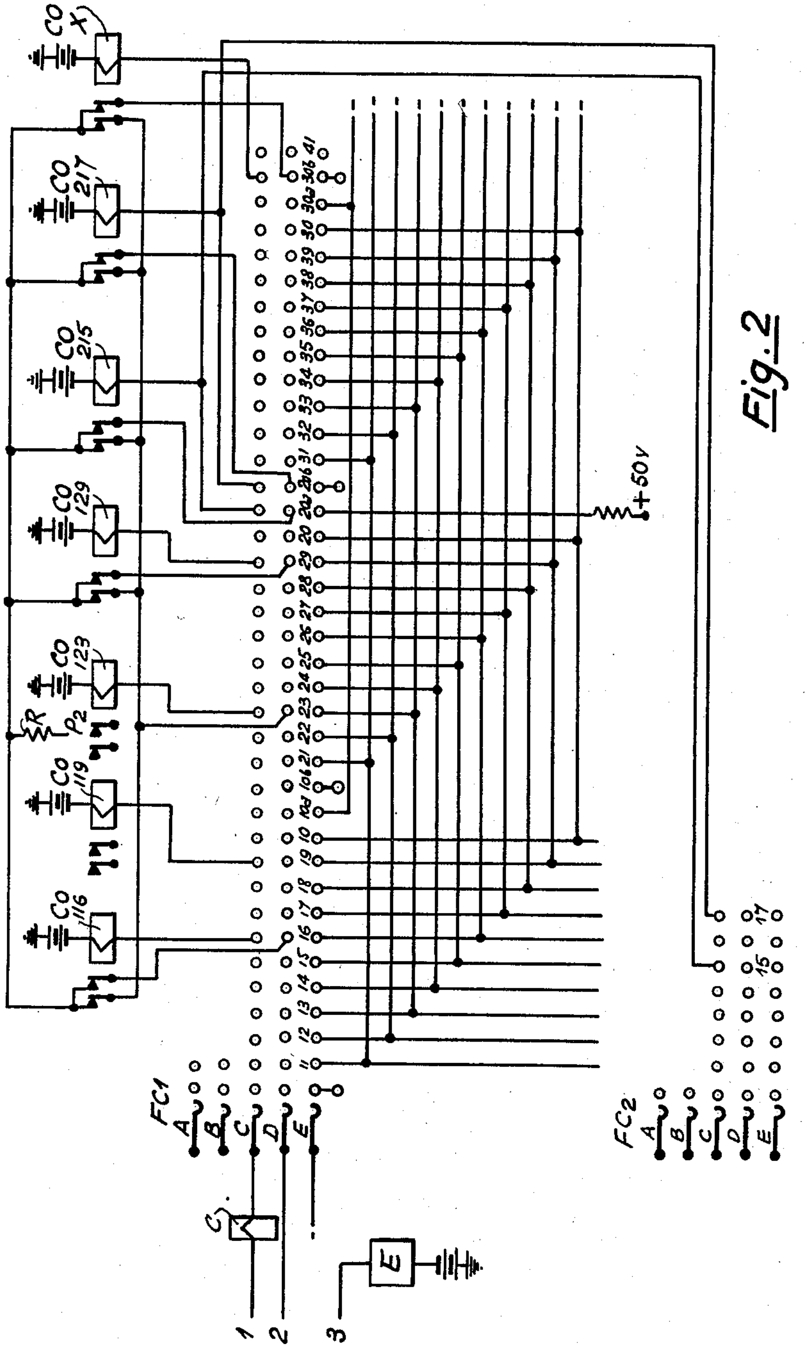
Fig. 2 represents the final selector in the state in which it would be found after the unit selection and at the moment of ascertaining the characteristic stated of the called line. This figure also represents the distribution of the line on a field of contacts in a final selector.

Referring to Figure 2, it will be seen that the final selector FC1 is connected to Figure 1 by wires 1, 2 and 3 during P. B. X hunting. This connection is obviously provided by the various group selectors which have been put into motion to provide the various selections. These group selectors have not been shown since the hunting for a grouped line is only described here.

Wire 1 is utilized to verify whether the called line is free or busy. Wire 2 is utilized for recognizing whether the line reached is a head of group line in order to distinguish the characteristic of the group and to provide the test of a free line in the group.

Wire 3 is used for feeding the clutch electro-magnet E of the final selector.

In Fig. 2, the electro-magnet E represents the clutch electro-magnet of the final selector for the displacement of brushes A, B, C, D, E of the field of contacts of the final selector.

The brushes and contacts A, B, are used for the establishment of the talking circuit. Brush and contacts C are used for testing and also for busying the called line. The brush and contacts D are used for characterizing the head of group lines non-consecutive and to permit the free hunting in all the group. Brush and contacts E are used for the placing into position of the final selector when the selecting for the tenth digits and for the unit selection, as has been described in French Patent No. 924,952, filed on January 17, 1946.

In Figure 2 there is shown the connection between the arc C of final selector FC1 and the cut-off relays Co of the various subscribers lines as well as the connection between the arc C of final selector FC2 and those relays.

Relay Co119 is a simple cut-off relay of the last line of a group with consecutive lines. Relay Co123 is the cut-off relay for the head of a group of non-consecutive lines; Co116 and Co129 are the cut-off relays of two lines supplementary to line 123 included in the same hundred as the head-of-group line 123.

Relay Co215 and Co217 are cut-off relays for two lines supplementary to line 123 included in a hundred group different from that in which is to be found the head-of-group line 123.

Relay *Cox* is the cut-off relay for an unnumbered line belonging to group 123.

In Figure 2 there is also shown the connections to the terminal of arm D, as shown in Figures 3*a*, 3*b*, 3*c*, 3*d*.

The set of terminals of the final selector comprises ten directions for ten numbers separated by two directions which are used as in French Patent No. 924,952, the first such as 10*a*, to stop the rotation of the final selector in the case of the call of a non-existing number; the second such as 10*b* for the marking of the following ten numbers.

As shown in Figure 2, the invention provides for the use of the directions 10*a*, 10*b*, 20*a*, 20*b*, etc for calling supplementary lines not included in the set of hundreds or for the call of unnumbered supplementary line.

Referring to Figure 3 representing the line circuits, it will be understood that there has been represented only the necessary devices for calls directed to subscribers and not the devices necessary for calls outgoing from the subscribers. On the left-hand side of each one of the drawings the line circuits are connected to the arcs of final selectors FC1 or FC2 on the direction corresponding to their individual calling number by the right-hand portion. The line circuits are connected to special devices intended to deal with calls outgoing from the subscriber or subscribers. These devices are generally line finders and have not been shown.

Figure 3a represents a simple line of the last line of a group of consecutive lines having non connection to terminal D; the marking potential connection to wire E permits the stopping of the final selector for the unit selection.

Figure 3b represents the first line or an intermediary line in consecutive grouping and has no potential connected to terminal D and a marking potential is applied on terminal E under the control of the back contact of the cut-off relay Co in order that this potential be not connected if the line is busy.

Figure 3c represents a head-of-group line for non-consecutive lines; the potential on terminal E is potential No. 3 since in the example considered the line has the number 123. The potential on terminal D depends upon the availability of supplementary lines. As will be seen on Figure 3c terminal D is connected to a back contact of relay Co for all the supplementary lines in the example described; this terminal D will therefore be connected to the back contact of the cut-off relays Co of lines 116, 129, 215, 217 and X. As shown in Figure 2, it will be understood that on terminals D for line 123, there exists a potential if at least one of the supplementary lines is available, but if there is no potential applied to terminal D, it indicates not only that the line reached has to provoke a free hunting, but is characterised by the number of the group in the final selector. The potential on terminal D will have therefore to be different for each one of the group of P. B. X. lines for the same final selector.

In the example under consideration it has been supposed that the group of lines 123 is the second group of the final selector and is characterised by potential $P_2$.

Figure 3d represents supplementary lines of the group under consideration on which a potential on wire E corresponds to the unit digits 6 for line 16, 9 for line 29, etc. and to a potential on wire D only when the line is free or available; this potential is the same as the one applied on the wire considered as head-of-group.

Figure 3e represents a busy line. The busying condition is obtained by a ground connected on wire c, thus setting up the energisation of a corresponding relay Co. The process which consists in characterising the busying condition of a line by a ground connected to wire c is well known in the art and it is not necessary to describe it further here.

Referring to Figure 1, it will be seen that relay Fs is actuated at the end of the unit selection, that is to say, when the final selector reaches a line corresponding to the called subscriber. The energising circuit for relay Fs is well known in the art and need not be described here.

Supposing that the line reached corresponds to a free line, the operation of the arrangement is as follows:

Relay Fs by its contact No. 1 connects relay Ft on wire c of the called line and as this line is free, relay Ft is energised by the following circuit:

Ground, back contact 1 of relay Pba, left hand winding of relay Ft, contact 1 of relay Fs, wire 1 (Figure 2), winding of relay C of final selector, brush and contact C of the final selector, winding of relay Co of the line reached and battery.

Relay Ft (Fig. 1) on energising causes the operation of relay F1 and this relay by its make contact 1 connects the right hand winding of relay Ft. This winding has a resistance lower than that of the left hand winding, thus causing at the same time the operation of relay C in the final selector of Figure 2 as well as the operation of relay Co of the reached line. Relay C in the final selector ensures switching which it is easy to imagine for extending the talking wires, and relay F1 by its contact 2 provides a switching operation suitable to advance the state of the connection for the establishment of the connection between subscribers.

Supposing now that the called line is busy and does not correspond to a head-of-group line. By reason of the ground connected on relay Co, as shown on Figure 3e, relay Ft is shunted and remains at rest and relay Oc is energised by means of the following circuits:

Battery, winding of relay Oc, make-contact 2 of relay Fs, break-contact of relay Ft and ground. Relay Oc is slow to operate in order to provide sufficient time for the operation of relay Ft when the line is available or free.

Relay Fs by its make-contact 3 connects point A in the potential comparing device on wire 2 and by its contact 4 connects point B of the comparing device to resistance R3.

Suppose that the line reached is line B119 on which terminal D is connected to no source of potential.

Wire 2 of Figure 1 is connected to wire D of the called line.

It will be seen on Figure 1 that the two points A and B of the potential comparing device are connected to the same potential. Point A is connected to —48 volts through resistance R2 and point B is connected to —48 volts by R3. As already described in the patent specification referred to above, when the potentials connected to the two points A and B are identical, tube V provides no output. There is, therefore no circulation current through resistances R4 and R5 and accordingly the potential applied to the terminals of the cold cathode tube CF is sufficient to set up ionisation in the tube and relay Cf operates and closes the following circuit:

Ground, make contact of relay Ht, make-contact of relay Cf, make-contact of relay Oc, brush and terminal a of step-by-step switch PBS in normal position, make contact 2 of relay Oc. This circuit acts in the register to cause the connection to advance to the state provided when the called line is busy. The operation of the register in the case in which the called line is busy is well known in the art and has therefore not been described here.

Supposing that the called line is line 116 corresponding to a supplementary line. If the line is free, this line offers a potential on wire D and relay Ft operates as previously described and there is no hunting for a free line. If this line is busy, the potential on wire D is disconnected and the operation is the same as that which has been described for a simple busy line. The hunting is not utilized since this line is a supplementary line which must be considered as an individual line when the latter is called by its proper calling number. If the called line is line 123, several cases have to be considered in order to understand fully the operation of the arrangement:

1. Line 123 is available; in this case relay *Ft* operates and the circuit operates as for the case of a simple and available line.

2. Line 123 is busy and none of its supplementary lines is free; in this case as shown in Figures 2 and 3 there exists no potential connected to terminal D on wire 123 and the call proceeds as in the case of a simple busy line.

3. Line 123 is busy and at least one of its supplementary lines is free; in this case when relay *Fs* operates the potential applied to point A in the potential comparing device is modified due to the circulation current existing in resistance R2 by means of the following circuit:

Potential P2 (Figure 2), resistance R, rest contact of one of the relays Co of the supplementary lines 116, 129, 215, 217 or X, terminal D of direction 23 of the final selector FC1, brush D of this selector, wire 2, back 2 of relay *Pba*, make-contact 3 of relay *Fs*, resistance R2, —48 volts. As the potential applied to point B of the potential comparing device is —48 volts, resistance R5 and thus the potential applied to the terminals of tube FC is inferior to the potential necessary to set up ionization. Relay *Cf* therefore remains at rest. As line 123 is busy, relay *Ft* remains at rest and therefore relay *Oc* operates and by means of its contact 3 it closes a circuit for advancing step-by-step switch PBS.

Battery, winding and interrupter PBS, break contact 3 of relay *Pba*, make contact 3 of relay *Oc*, break contact of relay *Cf*, make contact 1 of relay *Ht*, and ground. The step-by-step switch PBS moves according to known ways as well as its brushes *a* and *b* on the corresponding arcs. On the terminals of arc *b* are connected various different reference potentials. When the step-by-step switch PBS reaches position 1 resistance R3 is connected to potential No. 1 and there is lack of equilibrium between points A and B in the voltage comparating device and valve V continues to give an output current. When the step-by-step switch PBS reaches position 2, the potential applied to points A and B of the voltage comparating device is the same, since point A is connected to potential No. 2, as has been described previously; it is the same thing for point B, by arc *b* of step-by-step switch PBS. The valve ceases to provide an output current and tube *Cf* is ionised and relay *Cf* operates. Through the opening of its break contact it opens the stepping circuit of step-by-step switch PBS which stops on position 2; by its make-contact relay *Cf* closes the circuit of relay *Pba* by the following circuit:

Battery, winding of relay *Pba*, break contact 1 of relay *Pbb*, arc *a* of step-by-step switch PBS, make contact 1 of relay *Oc*, make contact of relay *Cf*, make contact 1 of relay *Ht*, and ground.

Relay *Pba* opens the circuit of relay *Ht* which is closed by the following circuit:

Battery, winding of relay *Ht*, break contact 4 of relay *Pba*, break contact 1 of relay *Pbc*, and ground.

As a result, relay *Ht* releases and cuts off the high tension supply which was applied to valve V and to tube CF. The tube deionises and relay *Cf* releases, relay *Pbb* which is no longer short-circuited by the ionising circuit for relay *Pba* operates in series with the winding of relay *Pba*. Relay *Pba* and *Pbb* remain operated through make contact 5 of relay *Pba*. It is obvious that the grounds which have been represented on the drawing by direct grounds are controlled by a relay, not shown, which connects ground when the circuit of the register is busy. It will be seen therefore that the various locked relays are freed at the same time as the register.

Relay *Pbb* when operating closes anew the circuit for relay *Ht* by its make contact 2 and by a circuit easy to follow.

Due to the operation of relay *Pba*, point A of the potential comparing device is disconnected from wire 2 and connected to wire 1, this wire corresponding to wire C of the called subscriber. The potential of point A is determined by the circulation current existing in resistance R2 due to the ground applied to wire *c* of the called line, as shown in Fig. 3*e*. Due to the opening of the break contact 6 of relay *Pba*, the potential of point B in the voltage comparing device is —48 volts, since resistance R3 is no longer connected to the potential P2; the potentials at points A and B are therefore different and therefore valve V supplies a current and relay *Cf* is at rest.

Condenser C1 and resistance R6 oppose ionization of tube CF during the building-up time for the current in resistances R4 and R5 and valve V.

On the other hand, relay *Pbb*, when operating, closes its contact 3 and thereby the circuit of electro-magnet E for the final selector represented in Figure 2, by connecting the break contact of relay *Cf* to wire 3; the final selector advances; when the circulation current which existed in resistance R5 is cancelled, the potentials of points A and B are identical and relay *Cf* operates, as has been previously described.

The circulation current through resistance R2 ceases only when the final selector has left the position of the busy line, either because the final selector is between two terminals or because it reaches a free line. The working of relay *Cf* stops the rotation of the final selector and by the closure of its make contact closes the circuit of relay *Pbc* which operates; its circuit is closed through a path analogous to the one described for the energization of relay *Pba*.

As previously, the circuit of relay *Ht* is open, relay *Pbd* operates and the potential comparing device is again put into operation as before. Point A of the comparing device is again connected to wire 2, that is to say that wiper D of the final selector and point B are again connected to potential P2. The electro-magnet E of the final selector is connected to the break contact of relay *Cf* through make contact 3 of relay *Pbb* and the rotation starts again under the control of relay *Cf* at rest. When the final selector reaches the supplementary free line, the potential which it meets on D is potential P2. The potentials of points A and B are then identical and relay *Cf* operates. It stops the rotation of the final selector and causes relay F1 to operate. The energization circuit of relay F1 is as follows:

Battery, winding of relay F1, make contact 1 of relay *Pbd*, make contact 1 of relay *Pbb*, arc *a* of switch PBS in position 2, make contact 1 of relay *Oc*, make contact 1 of relay *Cf*, make contact 1 of relay *Ht*, and ground.

Relay F1, as has been previously described, provides the necessary operations to advance the connection to the state of end of selection on the free line.

If the supplementary line which has been found free is a line in another group of final selectors, for example if this line is line 215, the final selector is stopped on terminal No. 20a. The terminals corresponding to this direction are connected to line 215 by connections which are established in parallel with those established on the final selector FC2.

As will be seen it is clear that a supplementary line can only comprise a single head-of-group line, since such line has a potential on wire D only if it is available. The supplementary lines may therefore preserve their own call number and be called individually without giving rise to a group hunting.

By referring to Fig. 2 there has been shown only a single head-of-group line 123. It is clear that line 116 could also be considered as a head-of-group line, and for this it would suffice that the potential on wire D of line 16 be no longer interrupted by the break contact of relay Co 116 but be connected as the one of line 23. Therefore two calling numbers would be available for the same group used for group hunting, to wit 116 and 123.

In the embodiment described it has been assumed that the characteristic of the P. B. X group was determined by potential P2. It is clear that in the same final group other characteristics could exist, one distinguished by potential P1 for instance and the other by potential P3, the choice of the potential P1, P2, P3 being such that no mix-up could take place.

In case of calling of the head of group line No. 3, it is clear that the step-by-step switch PBS would stop on position 3 and that only potential P3 could influence the voltage comparing device.

While the principles of the invention have been described above in connection with a specific example, and particular modifications thereof, it is to be clearly understood that this description is made only by way of example and not as a limitation on the scope of the invention.

What I claim is:

1. The method of testing and selecting a free line in a wanted group of telephone lines which comprises characterizing only the lines that are free in said group except the first line by a marking characterizing potential, characterizing the first line in said group by said same potential only if at least one of the other lines of said group is free, selecting the first line of said group, ascertaining whether the selected line is or is not free, further ascertaining in the case in which the wanted line is not free, whether or not said characterizing potential appears on said line, producing a busy indication if said characterizing potential does not appear on said first line, registering said characterizing potential if present on said line and successively exploring the remaining lines, and stopping the exploring action when a line having a potential corresponding to said registered characterizing potential is encountered.

2. A telephone system comprising a final selector having a plurality of terminals and a set of brushes for exploring said terminals, a plurality of lines connected to the terminals of said final selector and including a group of lines allotted to a single subscriber and connected to any of said terminals, means for providing each of said lines with one electrical characteristic if it is free and another electrical characteristic if it is busy, means for providing only the lines of said group that are free except the first line with still another electrical characteristic identifying said group, means for providing said first line with said same characteristic only if at least one of the other lines of said group is free, means for causing said final selector to hunt for a wanted line, a test device comprising means connected to the brushes of said final selector and operative in response to said free and busy electrical characteristics, means controlled by said responsive means when a free electrical characteristic is found on said wanted line for stopping said hunting means to cause said final selector to stop on said wanted line, means controlled by said responsive means when a busy electrical characteristic is found on said wanted line for registering any group-identifying characteristic found on said line, and means controlled by said registering means for operating said hunting means to cause said final selector to hunt and for stopping said hunting means when a line having said identifying electrical characteristic is found.

3. A telephone system comprising a final selector having sets of terminals in an arc and a set of brushes for exploring said terminals, a plurality of lines, each line being connected to a set of said terminals, and including a group of lines allotted to a single subscriber, said group comprising a first line and additional lines, the lines of said group being connected in any arrangement to said sets of terminals, a supplementary terminal in each set of terminals, means for applying a predetermined electrical potential to the supplementary terminals associated with all the free additional lines of said group and the first line of said group if any additional line thereof is free, means for causing said brushes to hunt over said terminals for a wanted line, means for registering said predetermined potential if it is found on a wanted line that is busy, control means under control of said registering means for starting said hunting means when said predetermined potential is registered, a comparing device having two input terminals one of which is connected to the brush exploring said supplementary terminals and the other of which is connected to said registering means, whereby it receives a registered potential, and means responsive to said comparing means for operating said control means to stop said hunting means when a supplementary terminal having a potential corresponding to said registered potential is found.

4. A telephone system comprising a final selector having terminals in an arc and brushes for exploring said terminals, a group of lines allotted to a single subscriber connected to any of said terminals, one of said lines adapted to be the first line of the group, means for causing said brushes to hunt for the terminal of a first line of a called group, means for applying an electrical characteristic to terminals corresponding to all the lines of said group other than the first, means for applying said same electrical characteristic to said first line when at least one of said other lines of said group is free, means connected to said brushes for registering the electrical characteristic found when said selector has stopped on the terminals of a called line which is busy and that line is the first line of said group, and means controlled by said registering means for starting said hunting means again and for stopping said hunting means when a terminal is reached having said electrical characteristic.

5. A telephone system comprising a plurality of lines some of which are arranged in groups, a final selector having sets of terminals to which said lines are connected regardless of the grouping thereof, there being a supplementary terminal for each line, and a set of brushes including a supplementary brush for exploring said terminals, means for applying an identifying electrical characteristic to the supplementary terminal of each line which is the first line of a group when any other line of the group is free, means for applying said same identifying electrical characteristic to the supplementary terminal of each other line of said group when said line is free, a device for comparing electrical characteristics having two input circuits, means for connecting one of said input circuits to said supplementary brush, means for applying an electrical characteristic corresponding to a called line to the other of said input circuits, means for causing said brushes to explore said terminals, means for utilizing said comparing device to stop said exploring means when the electrical characteristics applied to said input circuits bear a predetermined relation, and means for suppressing said electrical-characteristic-applying means on the supplementary terminals of a first-of-group line and all said other lines of said group when all said other lines are busy.

6. A telephone system, according to claim 5, in which there are five terminals in each set of terminals of the final selector, a fifth terminal being the supplementary terminal, and there are five brushes, the fifth brush being the supplementary brush and in which the electrical characteristics for identifying the first line of a group of lines is a predetermined potential and the comparing device is arranged for comparing potentials and the means for applying an electrical characteristic corresponding to the called line to the other input of the comparing device is a means for applying a potential thereto corresponding to the called line.

References Cited in the file of this patent

UNITED STATES PATENTS

| Number | Name | Date |
|---|---|---|
| 2,190,140 | Taylor | Feb. 13, 1940 |
| 2,421,919 | Avery | June 10, 1947 |
| 2,598,822 | Oberman | June 3, 1952 |